I. R. Y. MARBLE.
WEAR RESISTING LAMINATED FABRIC.
APPLICATION FILED MAY 1, 1911.

1,126,648.

Patented Jan. 26, 1915

Inventor
Isabel R. Y. Marble

Witnesses

By Sturtevant & Mason
Attorneys

UNITED STATES PATENT OFFICE.

ISABEL R. Y. MARBLE, OF NEWPORT, RHODE ISLAND.

WEAR-RESISTING LAMINATED FABRIC.

1,126,648.	Specification of Letters Patent.	Patented Jan. 26, 1915.

Application filed May 1, 1911. Serial No. 624,421.

*To all whom it may concern:*

Be it known that I, ISABEL R. Y. MARBLE, a citizen of the United States, residing at Newport, in the county of Newport, State of Rhode Island, have invented certain new and useful Improvements in Wear-Resisting Laminated Fabrics, of which the following is a description, reference being had to the accompanying drawing and to the letters and figures of reference marked thereon.

The invention relates to new and useful improvements in wear-resisting laminated fabric, and more especially to fabrics of this character, which are used in the construction of automobile tires.

An object of the invention is to provide a construction of fabric which shall be wear and puncture-resisting, which may also be readily made and handled, and which is of comparatively low cost.

Figure 1:
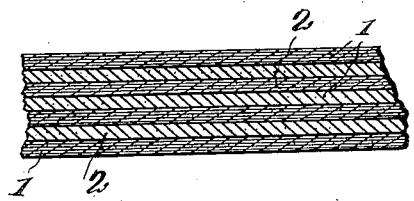
Figure 2:
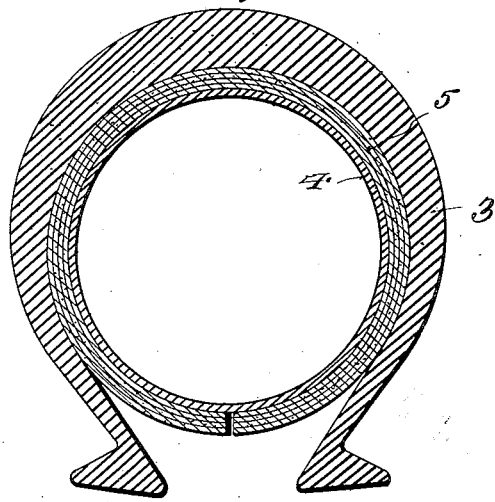
Figure 3:
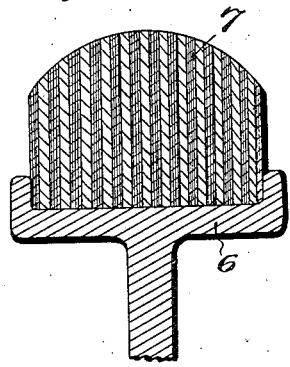
Figure 4:
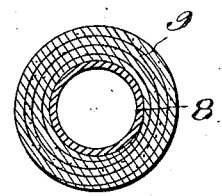

In the drawings which illustrate the invention and several applied uses of the same,—Figure 1 is a sectional view through a fabric embodying the invention; Fig. 2 is a sectional view through a pneumatic tire, showing the improved fabric, applied as a protective armor to said tire; Fig. 3 is a sectional view, showing the improved fabric applied as the tread to a solid tire; Fig. 4 is a sectional view, showing the improved fabric wound spirally about a central tube to form a cushion tire.

The improved fabric consists of alternate sheets of canvas and sheets composed of several pieces of Manila or other suitable paper aggregated under pressure with the aid of an adhesive, into a single sheet, the whole fabric of alternate layers of canvas and multiple paper sheets being likewise aggregated under pressure with the aid of an adhesive.

Commercial rubber cement may be employed as suitable bonding agent or adhesive, but some forms of glue, oxidized oil or other rubber substitutes may be employed with good effect, as well as unvulcanized rubber compounds which may be treated under heat and pressure to bind the aggregated sheets together. The adhesive substance is plastic when first applied, and elastic in its final condition.

The fabric resulting is a material very effectively resistant against tearing strains or puncture by sharp instruments. This effect is due to the toughness of Manila paper against injuries of this character, which qualities are increased to a high degree by the association of the several layers of the material held together by a suitable elastic binding agent. When the natural lay or direction of the fibers in the paper is crossed in alternating layers, this result is further emphasized. The paper sheet element of the aggregate further possesses qualities peculiarly adapting it for use in pneumatic and other tires, where it is to be associated under pressure with soft rubber, which should be protected against wear. The paper fabric has a high tensile strength, without being wholly devoid of tensile elasticity. Its resistance to bending strains is considerable, while under long wear and fatigue, the portions most affected develop no ragged or harsh edges apt to abrade the rubber parts of the tire.

While still moist (or when the binding agent is unvulcanized or plastic) the paper element of the aggregate is nearly as flexible as the cloth element, and the form of the tire-armor reinforcement or wear-taking element into which it is to be formed, may be given it by molding operations easy to carry out, or the entire structure may be readily built up by forming my new fabric *in situ* about the tube or other mandrel, which it is designed to protect, in successive alternate layers of the prepared paper sheets and the cloth or canvas. The materials entering into the aggregated sheet are cheap, while the necessary steps of putting them together are simple and inexpensive.

Referring to the drawings, in Fig. 1 the fabric is shown as composed of a plurality of layers 1 of fabric, and a plurality of layers 2 of paper, which are alternately arranged and secured together in the manner above described. The layers of paper 2 are preferably laminated in the manner stated.

In Fig. 2 I have shown a pneumatic tire, consisting of an outer shoe 3 and an inner tube 4. Lying between the inner tube and the outer shoe is a layer 5 of my improved fabric. This layer 5 of fabric is bent into proper shape during the making up of the layers of fabric, and after being applied to the tire will serve as a protective armor for preventing the inner tube from being punctured.

In Fig. 3 I have shown the rim 6 of a wheel as provided with a tread 7, which is formed of my improved fabric and layers of rubber placed on the rim, so that the layers extend in the general direction of the rim, that is, lie in the plane of the wheel, and are vertical.

In Fig. 4 I have shown a tube 8, around which the laminated fabric is wound spirally as at 9, so as to form an outer covering for the tube 8, and thereby a cushion tire construction.

The advantages of the improved fabric in its various uses, as herein described, will be apparent from the detail description of the fabric. While I have shown the fabric as applied in the various ways illustrated in the drawings, it will be obvious that said fabric may be used in many other ways, wherever it is desired to provide a wear or puncture-resisting material.

Having thus described my invention, what I claim as new and desire to secure by Letters Patent, is:—

1. A fabric structure for use as a wear-taking and strain-resisting element, comprising alternate layers of a textile fabric, and of laminæ of strong paper aggregated together by an elastic adhesive, and molded to a form curved in cross section.

2. A molded wear-resistant protecting strip, comprising in its construction a laminated fabric comprising a plurality of layers of strong paper aggregated together by an elastic binding material, alternating with layers of a woven textile fabric.

In testimony whereof I affix my signature, in presence of two witnesses.

ISABEL R. Y. MARBLE.

Witnesses:
 ELISABETH GILMAN,
 DELIA W. MARBLE.